Feb. 27, 1934. E. M. PFAUSER Re. 19,093

COUPLING FOR SOCKET WRENCHES

Original Filed Aug. 24, 1929

Inventor.

E. M. Pfauser

By Emory Jackson Brett & Dunn

Attorneys.

Reissued Feb. 27, 1934 Re. 19,093

UNITED STATES PATENT OFFICE 19,093

COUPLING FOR SOCKET WRENCHES

Edward M. Pfauser, Milwaukee, Wis., assignor to Blackhawk Manufacturing Company, Milwaukee, Wis.

Original No. 1,896,645, dated February 7, 1933, Serial No. 388,201, August 24, 1929. Application for reissue March 25, 1933. Serial No. 662,819

4 Claims. (Cl. 287—119)

My invention refers to wrenches of the interchangeable socket type and particularly to heavy-duty wrenches. Under ordinary conditions, the heavy-duty sockets, when locked in connection with the wrench stem, are exceedingly difficult to disconnect by some manual release means.

My present invention, therefore, is particularly directed to a simple, effective and economical manually controlled lock and release mechanism for the wrench-head proper, whereby the interchangeable heads are readily attached or removed as the case may require.

With the above objects in view, the invention consists in certain pecularities of construction and combination of parts, as will be fully set forth with reference to the accompanying drawing and subsequent claims.

Figure 1:
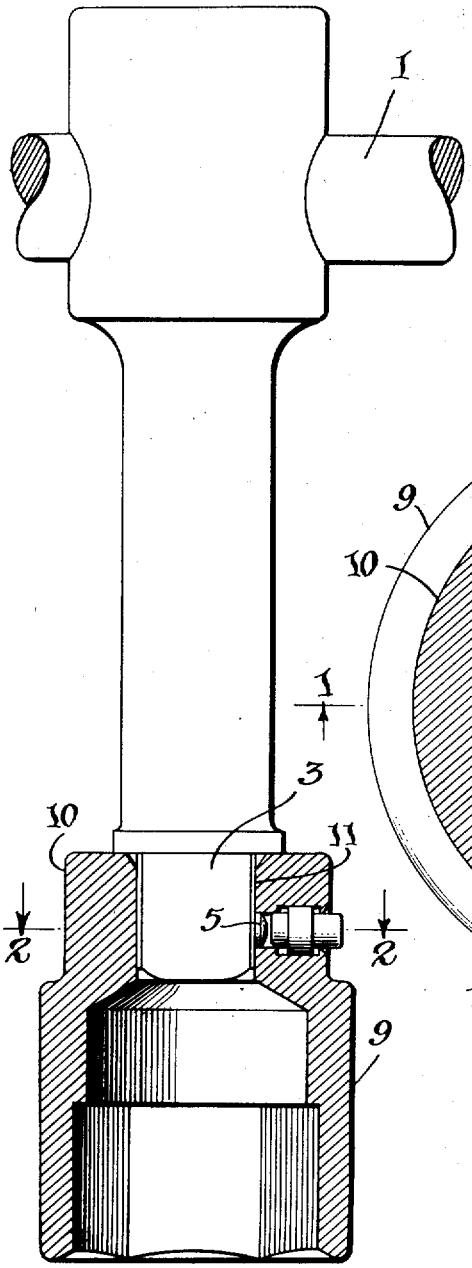
Figure 3:
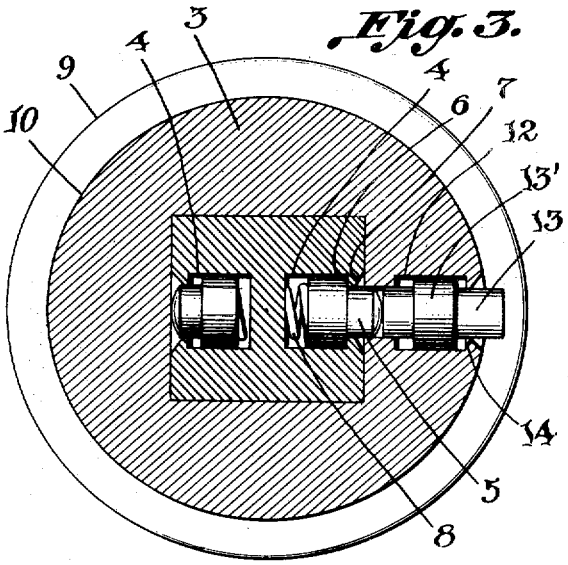
Figure 2:
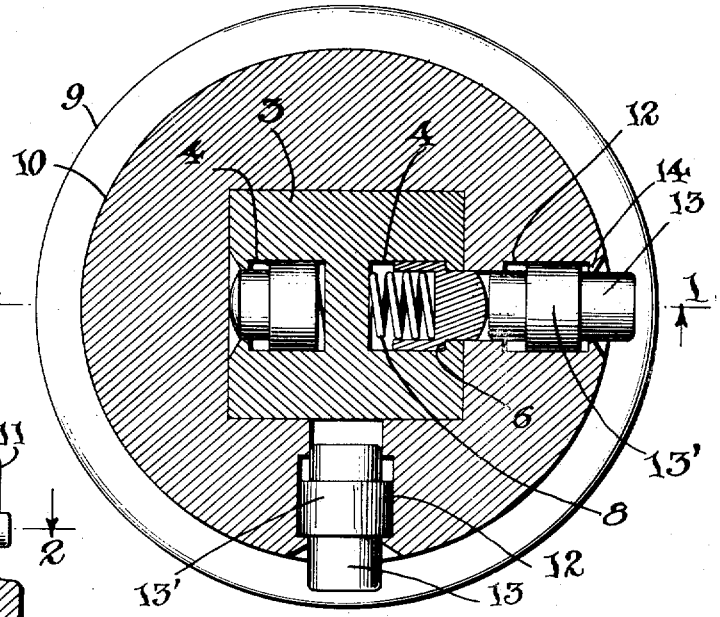

In the drawing, Figure 1 represents a side elevation of a wrench equipped with a wrench-head or socket, embodying the features of my invention, the socket head being in section, as indicated by line 1—1 of Figure 2; and Figure 2 is an enlarged cross section of the same, the section being indicated by line 2—2 of Figure 1, and Figure 3 is a view similar to Figure 2 of a modification.

Referring by character to the drawing, 1 indicates an actuating bar and 2 the stem of a wrench. The stem terminates with a reduced polygonal shank 3, the shank in this particular instance being rectangular in form.

As best shown in Figure 2 of the drawing, the squared shank 3 is provided with axially aligned recesses 4—4. Loosely mounted in each recess is a locking plunger 5 which plunger is reduced intermediate of its ends to form a shoulder 6, whereby said plunger is permanently held within the recess by an upset at the mouth of the recess, which upset forms a flange 7 for engagement with the shoulder. The outer end of the plunger normally projects beyond the face of the plunger for locking purposes, and the inner end of said plunger is cupped for the reception of a coil spring 8, which spring is interposed between the base of the plunger cup and recess 4.

Fitted to the wrench shank is an interchangeable wrench-head 9, which head in this exemplification of my invention is of the socket kind. The head is of perfectly circular contour and it is formed with a reduced circular neck 10, which neck is provided with a polygonal socket 11 which corresponds in shape to the shank which, as previously stated, in this instance is rectangular in cross section.

The wrench-head neck is provided with a pair of circular openings 12—12 extending therethrough, which openings are disposed radially and at an angle of 90 degrees, as best shown in Figure 2. The inner ends of the openings correspond in diameter to the plunger 5, one of which is always in actual alignment with the plunger. These openings 12 for a predetermined distance are enlarged to receive collar portions 13′ of push buttons 13, and said push buttons are thus loosely mounted and adapted to reciprocate back and forth in the openings, but are permanently confined by downturned flanges 14, formed in the outer wall of the head neck. Hence, the movements of said plunger are limited in both directions and, owing to the shouldered enlarged portions of the openings 12, the inner ends of the buttons will at no time project beyond the face or faces of the female neck socket.

Hence, when the wrench shank enters the socketed neck, it is impossible for either plunger to abut the face of a button, until the plunger is aligned with the button opening. It will also be observed by reference to Figure 2 that when a plunger 5 is in locking engagement with the wrench-head, owing to the spring associated with the plunger 5, the aligned button will be forced out in such a position that the outer end of the button is extended beyond the outer wall of the neck. It will also be observed that owing to the fact the head is of greater diameter than the neck, the button is more or less protected to prevent injury to parties handling the wrench-head in a turning operation. This is due particularly to the fact that parties guiding the wrench will, under all conditions, grasp the larger end of the head.

Attention is also directed to the fact that, owing to the peculiar arrangement of the pair of plungers with reference to the releasing buttons, a coupling operation can be effected without any attention to alignment between a plunger and a releasing button.

Furthermore, it will be observed from the foregoing description that when it is desired to release a wrench-head, the operator simply presses the extended button whereby pressure is exerted upon its associated plunger 5 to release it from the locking opening 4 into which it was previously seated. Briefly, it will be understood that in this device each interchangeable wrench-head carries one or more push buttons for releasing the blind locking mechanism.

Where only one release position and plunger 13 are provided, as illustrated in Figure 3, the user may optionally lock the parts by registering one of the locking plungers 5 with the single release plunger 13, or by turning the shank so as to bring the locking plungers 15 out of register with the locking opening 12, optionally hold the parts 2 and 10 by frictional engagement only.

While I have shown and described one particular exemplification of my invention in all of its details, it is understood that I may vary such details within the knowledge of the skilled mechanic and as interpreted by the language of the claims.

I claim:

1. In a tool connection, a shank of polygonal shape in cross section, a member having a socket similarly shaped for releasably receiving the shank, a spring-pressed latch plunger carried by the shank, the member having a keeper opening for receiving the latch plunger, said opening extending entirely through the member and having limiting shoulders adjacent to its opposite ends, and a release button for the plunger latch slidably mounted in the opening having an annular enlargement intermediate its ends for engaging the limiting shoulders at the ends of its movement.

2. A coupling for a shank and wrench head, comprising a polygonal stud member and a cooperating socket member having a cooperating polygonal bore fitting said stud, said stud being insertable endwise into the bore of said socket in any one of a plurality of angular positions for easily detachable connection and adapted to transmit torque by virtue of said polygonal fit, said members having means for preventing endwise separation when desired, comprising a locking pin carried by the stud and extending from one of the polygonal sides of the stud, and a registering opening through the wall of the socket, the thickness of the socket walls defining said opening being greater than the length of the projecting part of the pin whereby said opening constitutes a bore, the pin projecting into the inner end of the bore only and the outer end of the bore forming a guide for a releasing pin, said stud having a transverse recess in one of its polygonal sides in which recess said pin is guided and retained, said pin having a reduced end adapted to project from said recess into the inner end of the bore of said opening, the recess having a shoulder at its mouth for cooperating with the pin to limit the outward travel of said reduced end to a distance less than the length of the registering opening in the socket, a spring in said recess tending to push the pin out of the recess, said pin projecting into said opening substantially at right angles to the longitudinal axis of said members whereby said members are positively locked against longitudinal separation when the opening and pin are in register, and the stud and socket are frictionally held together when the pin and opening are out of register.

3. A coupling for a shank and wrench head, comprising a square stud member and a socket member having a cylindrical exterior periphery and a cooperating square bore fitting said stud, said stud being insertable in said socket member in any one of a plurality of angular positions and being adapted to transmit torque by virtue of said square fit, said members having means for preventing endwise separation, comprising a locking pin carried by the stud and extending from one of the square sides of the stud, and there being a registering opening through the side wall of the socket where the wall of the socket has substantially maximum thickness between the square bore and the cylindrical periphery, whereby the said opening provides a bore for receiving the locking pin at its inner end, and a guide at its outer end for guiding a releasing pin, said stud having a transverse recess in one of its square sides in which recess said pin is guided and retained, said pin having a reduced end adapted to project from said recess, the recess having a shoulder at its mouth for cooperating with the pin to limit the outward travel of the reduced end to a distance less than the length of said registering opening in the socket, and a spring in said recess tending to push the pin out of the recess, said pin projecting into said opening substantially at right angles to the longitudinal axis of said members whereby said members are positively locked against longitudinal separation.

4. A coupling for a shank and wrench head comprising a stud member of non-circular section and a cooperating socket member having a bore mating with said stud, said stud being insertable endwise into the bore of said socket and being adapted to transmit torque by virtue of the non-circular configuration of the cooperating parts of the members, said members having means for preventing endwise separation comprising a locking pin carried by said stud and extending from the side of the stud, there being an opening in the side wall of the socket registering with the position of the locking pin, the wall thickness of the socket member about said opening being great enough to provide a bore for receiving at its inner end the part of the pin which projects from the stud and providing a guide at its outer end for guiding a releasing pin, said stud having a transverse recess in which recess said pin is guided and retained, said pin having a reduced end adapted to project from said recess, the recess having a shoulder at its mouth for cooperating with the pin to limit the outward travel of the reduced end to a distance less than the length of said registering opening in the socket, and a spring in said recess tending to push the pin out of the recess, said pin projecting into said opening a sufficient distance to lock positively said members against longitudinal separation.

EDWARD M. PFAUSER.